March 10, 1936.   L. A. CRABTREE   2,033,115
TIRE CHAIN APPLIER FOR VEHICLES
Filed Dec. 27, 1934   4 Sheets-Sheet 1
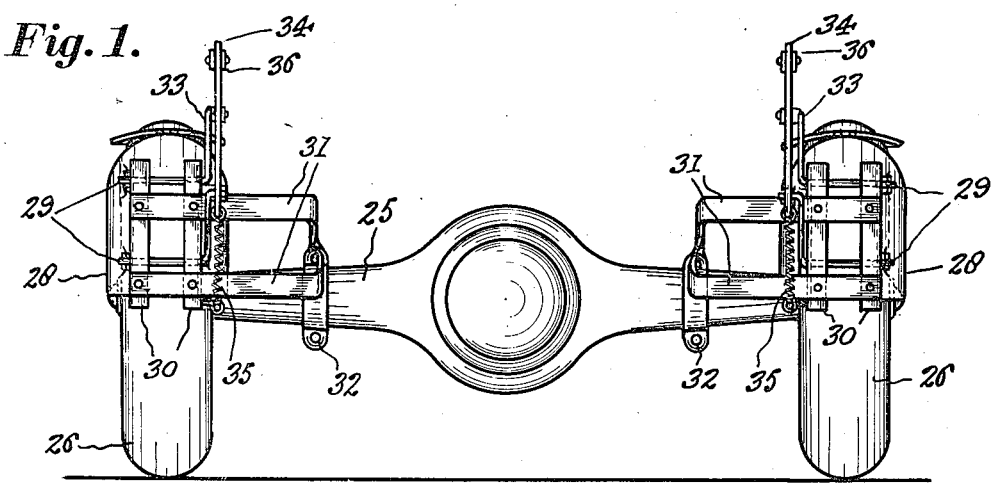
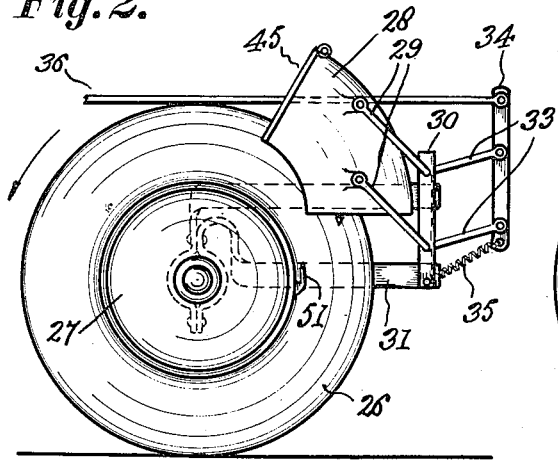
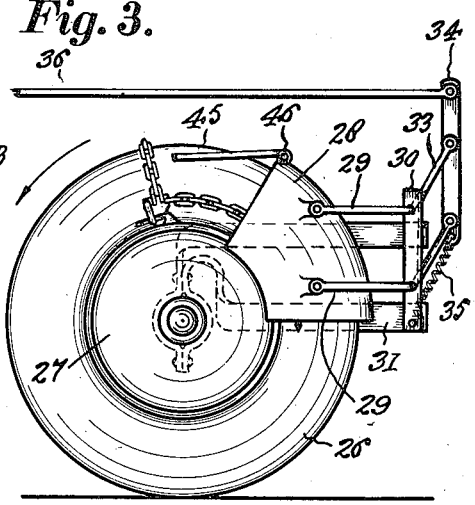
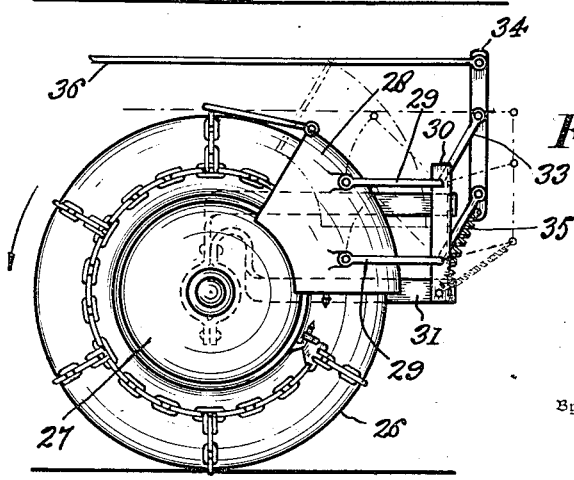
Inventor
L. A. Crabtree
By Arthur H. Sturges  Attorney

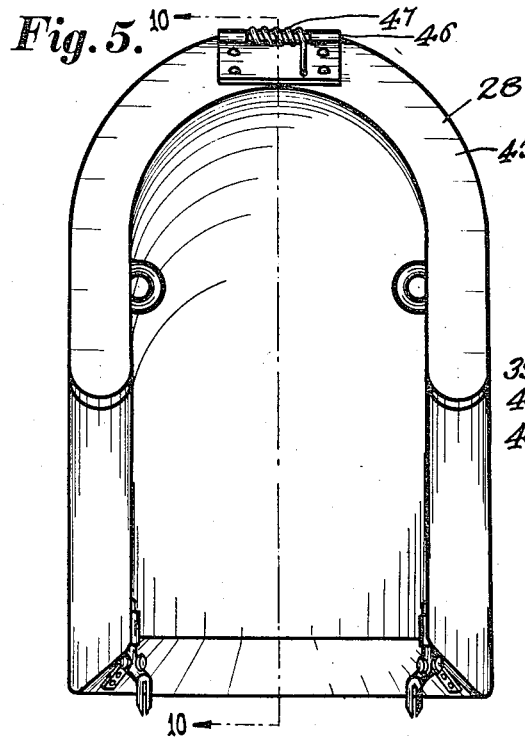
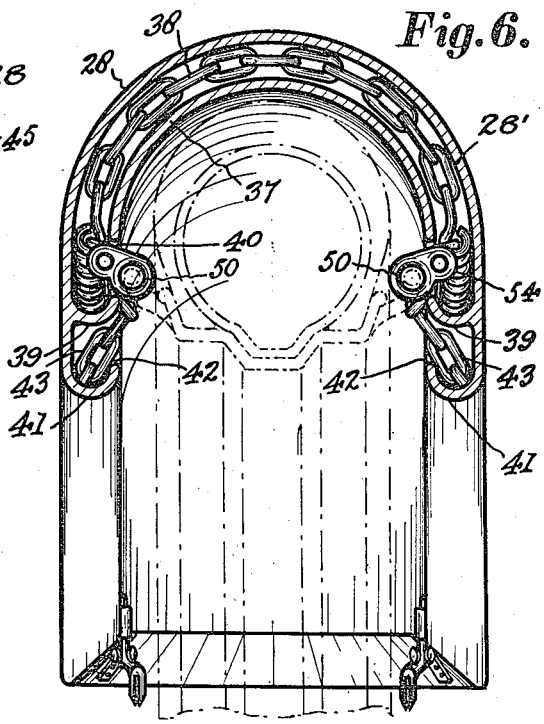
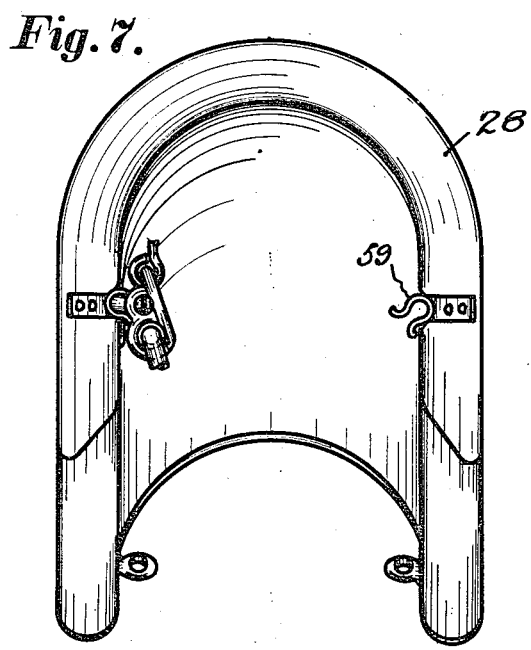
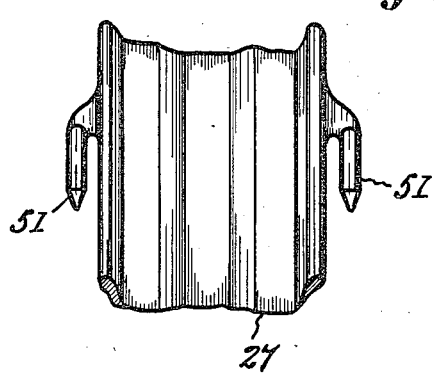

Fig. 9.
Fig. 10.
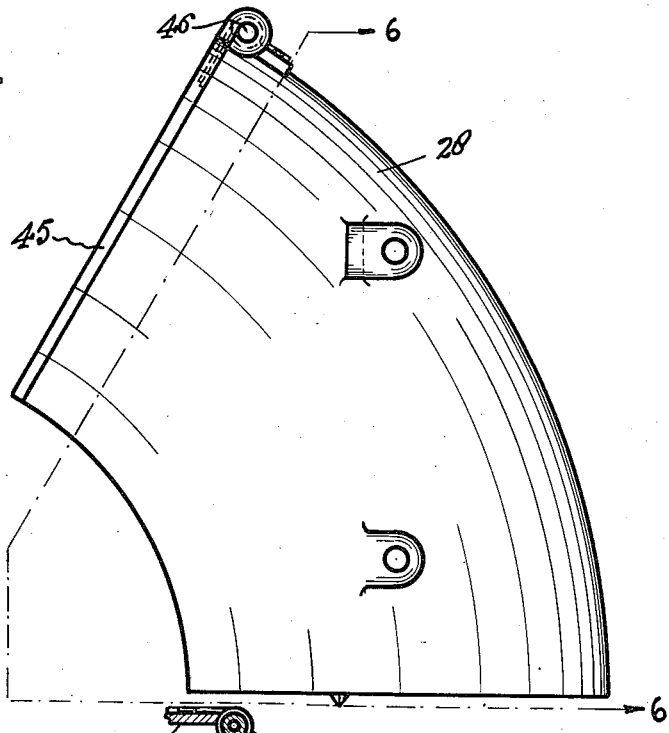
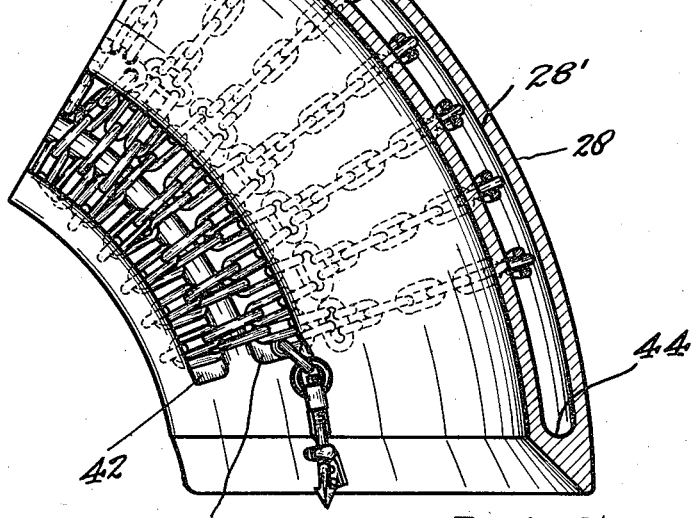

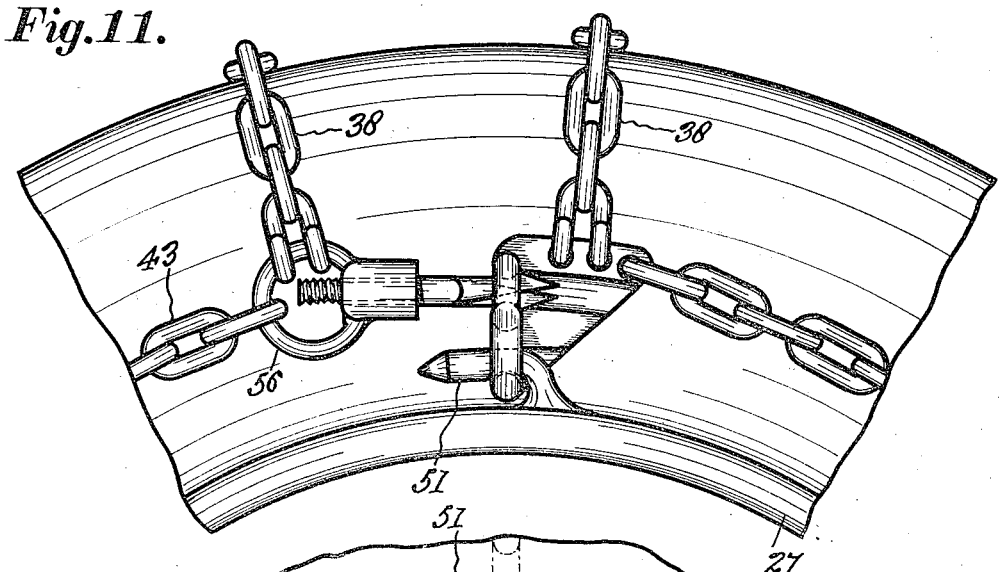
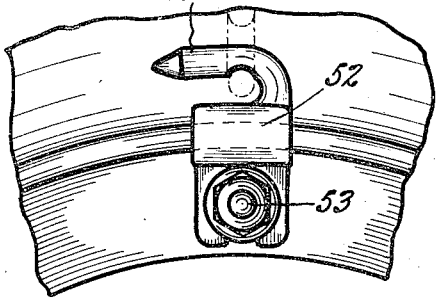
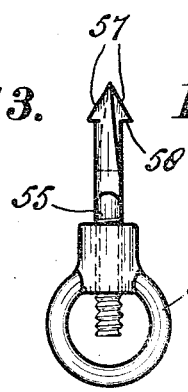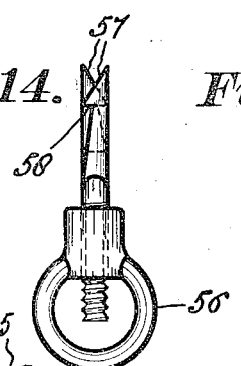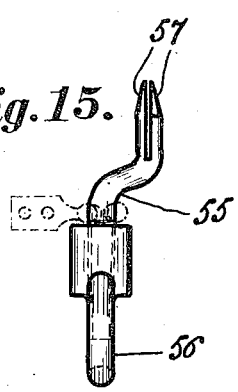
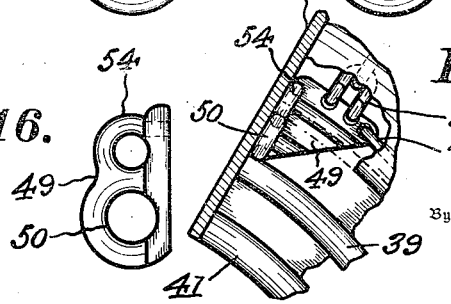

Patented Mar. 10, 1936

2,033,115

UNITED STATES PATENT OFFICE 2,033,115

TIRE CHAIN APPLIER FOR VEHICLES

Levi A. Crabtree, Rockport, Mo., assignor of twelve and one-half per cent to George W. Boettner, Rockport, Mo.

Application December 27, 1934, Serial No. 759,385

3 Claims. (Cl. 152—14)

The present invention relates to traction devices, and has more particular reference to the application of tire chains to the wheels of vehicles without manually handling the chains in the application and while the vehicle is in motion.

Heretofore numerous attempts have been made to accomplish this result. However, these prior attempts have met with failure for various reasons, among which may be chiefly pointed out the failure to properly register the chain during its application to the tire in proper transverse alinement with the tire, all prior devices being carried upon the running board or other portion of the vehicle which is subject to lateral sway with respect to the plane of the wheel.

It is therefore among the objects of the present invention to overcome this difficulty and to provide a storage device for a chain which is at all times held in proper radial alinement with the wheel so that when the chain is applied to the wheel the chain will be placed thereover in proper position with the side chains spaced at equi-distances from the wheel axis.

Another object of the present invention is to provide an automatic chain applying means for wheels which is so disposed and is so operable that the chain is applied over the top of the tire from the upper rear portion thereof so that as the wheel moves forwardly the chain will be drawn out of its holder and will be stretched and properly applied to the tire during the turning of the wheel, and wherein the forward end of the chain is automatically coupled to the wheel so that the chain will be drawn taut during the operation, and wherein the rear end of the chain is finally brought into interlocking engagement with the forward end to close the chain on the wheel.

Another object of the invention is to provide a mechanism for accomplishing this purpose which is set in motion or operation merely by actuating a connecting or pull rod from any suitable position adjacent the operator of the vehicle, the operation of the rod being manual, such as by a lever or the like, or may even be operated by a foot lever or any other suitable actuating means desired.

Another feature of the present invention is to provide a wheel with chain take-up devices for automatically picking up the forward end of the chain when the latter is swung into position against the wheel, and to provide such devices which may be integrally disposed on the wheel as a part thereof, or which may be detachably connected to the wheel in the form of a tire lug device so that the present invention may readily be applied to present day vehicles which are already manufactured, and may also be incorporated in the construction of new vehicles.

The invention also aims at the provision of a chain housing or support which is mounted upon the axle housing or its equivalent so as to hold the chain carrier in proper alinement with the wheel at all times, and to provide the carrier with means which will normally hold it out of contact with the wheel and which when operated will move the carrier down into position with respect to the wheel for discharging the traction chain, this supporting means for the carrier is readily adaptable to integral construction with the axle housing or other part and also as an attachment for present day constructed vehicles.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a rear elevation of the traction wheels and axle housing of a vehicle with the new device mounted thereon.

Figure 2 is a side elevation of a wheel of the vehicle and showing the relative position thereof with respect to a traction chain housing of the new device at the time when the housing is in a normal raised position.

Figure 3 is a view similar to Figure 2 but showing the housing in a lowered chain applying position during revoluble movements of the wheel.

Figure 4 is a view similar to Figure 3 but showing the relative position of the parts at a time near the completion of the chain placing operation and joining of the free ends of the chain together.

Figure 5 is a front elevation of the tire chain housing or carrier with the tire chain mounted therein.

Figure 6 is a view similar to Figure 5 but showing a portion of the housing in section, the view being taken on dotted line 6—6 of Figure 9.

Figure 7 is a bottom plan view of the carrier shown in Figure 5.

Figure 8 depicts a fragment of a tire carrying rim provided with integral chain hooks.

Figure 9 is an enlarged side elevation of a chain housing.

Figure 10 is a sectional view of the chain housing, the section being taken along the dotted line 10—10 of Figure 5.

Figure 11 is an enlarged view of a fragment of a tire, rim and chain and showing the relative position of the parts of the tire-chain after a complete application thereof to a wheel and the joining of the free ends of the chain together.

Figure 12 shows a modification of the hooks shown in Figure 8, the hook of Figure 12 being formed integral with a tire-rim lug and removable from the tire-rim.

Figure 13 is a side view of a removable chain lock employed.

Figure 14 is a view similar to Figure 13 but showing the hooks of the lock compressed within the longitudinal plane of the shank portion thereof.

Figure 15 is a view similar to Figure 13 but turned at a right angle of 90 degrees with respect thereto and illustrating the offset portion of the shank thereof as employed with certain types of automobile wheels.

Figure 16 is a front view of an apertured side chain and plate, and

Figure 17 is a fragmental view showing the manner of storing an end plate employed within its carrier.

Referring now to the drawings, and first to Figures 1 to 4, 25 designates the rear axle housing of a motor vehicle and 26 designates the tires of wheels carried by the axle 25, the wheels having the usual body portions or rims 27.

The chain to be applied to the tire 26 is mounted in a housing 28 which serves as a carrier or support for the chain. The carrier 28 is of segmental shape conforming substantially to that of the outer or tread portion of the tire 26 and which thus is longitudinally curved and is transversely rounded to fit snugly over the tire when it is lowered into position. The casing or housing 28 is pivotally mounted upon the forward ends of a pair of U-shape arms 29 which are disposed in parallelogram arrangement with the pivots of the housing 28 disposed in vertical spaced apart relation and alinement and with the pivotal connections of the rear ends of the arms 29 disposed in similarly spaced apart and vertical alinement on an upright 30. The U-shape arms 29 are disposed at opposite sides of the housing 28 and the closed ends thereof are engaged through the standard 30. The standard 30 is suitably supported in substantially vertical position in rear of the tire 26 and in the present instance is mounted upon a pair of spaced apart bracket arms 31 which extend forwardly at the inner side of the tire or wheel and are clamped or otherwise suitably secured to the rear axle housing 25.

These bracket arms 31 are suitably twisted so as to dispose their rear portions substantially vertically to offer considerable resistance against vertical movement and thus hold the standard 30 relatively rigid. The bracket arms 31 may be clamped to the axle by clamping bolts 32 or the like. Of course, there is a similar construction for each of the rear wheels, or other wheels to which the chains are to be applied and a description of one is thought to suffice for all of the structures. Each arm 29 is provided with a rearwardly extending projection or finger 33, and these projections 33 are pivotally connected to a bar 34 which is normally urged downwardly by a spring 35 or the like having one end attached to the lower end of the bar 34 and its other end to the lower end of the standard 30. The spring 35 is of such strength as to overbalance the weight of the housing 28 when the chain is therein, and the bar 34 extends upwardly beyond the fingers 33 and is connected to an actuating rod 36 which extends forwardly or in any other suitable direction to a suitable point of control or operation so that the operator may move the rod 36 while the vehicle is in motion and lower the chain housing 28 upon the tire 26. Of course, the housing 28 does not drag upon the tire but lies closely adjacent thereto for accomplishing the purpose of the invention.

Referring now more particularly to Figures 5 to 10, the housing or carrier 28 for the chain has an outer wall or body, designated by the numeral 28' and has an inner wall 37 which is spaced from the outer wall 28' and provides a transversely curved and substantially semi-circular chamber within the housing. The walls 28' and 37 are spaced apart a distance sufficient to freely receive therein the tread or cross chains 38 of a tire chain, and the bottoms of this transversely curved chamber are in the form of downwardly arched flanges 39 extending from the outer wall of the housing 28 and which are spaced at their inner edges from the adjacent edges of the inner wall 37 to form therewith curved slots 40 which follow the general curvature of the housing 28 and are disposed in the opposite inner sides thereof. Beneath the flanges 39 the housing is provided with a second pair of curved flanges 41 spaced sufficiently beneath the flanges 37 to provide curved longitudinal chambers in the opposite sides of the housing, as shown in Figure 6. These flanges 41 terminate at their inner ends in spaced relation from the flanges 39 to provide curved slots 42 which are spaced inwardly and are disposed in concentric relation with respect to the slots 40.

The tire chain has its side chains 43 looped downwardly from between the cross chains 38 so that the loops of the side chains extend inwardly toward each other through the slots 40 in the side walls of the housing 28 and the lower ends of the side chain loops are deposited in the inner curved flanges 41, projecting through the inner slots 42.

As shown in Figure 10, the lower end of the transverse chamber is closed by a wall 44 so that the chain when nested in the holder will rest on the wall 44, and the slots 40 and 42 terminate in spaced relation to the lower end of the holder so as to maintain the loops of the side chains 43 in proper position for easy withdrawal from the upper end of the holder. A cover 45 is hingedly mounted at 46 upon the upper portion of the holder 28, and the cover 45 is of substantially U-shape so as to fit against the upper open end of the holder, as shown in Figure 5, to close the same and also to fit with the holder over and about the tire 26 when the chain is to be applied. A spring 47 is mounted on the hinge 46 for yieldingly holding the cover 45 closed. The forward end of the tire chain is provided with a combined coupling member 48 adapted not only to assist in holding the front and rear ends of the chains together when applied, but to also couple the forward end of the chain to the wheel so that the wheel in turning will pull the chain out of the holder 28. This coupling member 48, as best shown in Figures 11, 16 and 17, comprises a plate which at its upper edge portion is secured to the adjacent end of a cross chain 38 and at its rear end is connected to the adjacent end of the side chain 43. A loop flange 49 extends outwardly from the forward edge of the plate 48 and is adapted to lie substantially radially to the wheel and is provided at its inner end portion with a large eye 50 which outstands from the plate 48, and as shown in Figure 6, outstands beyond the cover 45 and the inner wall 37 of the housing 28 when the chain is stored therein.

These eyes 50 are of sufficient size to freely receive therethrough forwardly directed hooks 51 which are carried upon the rim 27 or other part of the wheel body. The hooks 51 are disposed in alinement with the eyes 50 when the chain carrier 28 is lowered into position so that the turning of the wheel will cause the hooks 51 to engage the eyes 50 at opposite sides of the wheel and to thus uniformly and equally draw the forward end of the tire chain out of its holder and over the tread of the tire. The hook 51 may be integral with the rim 27, as shown in Figure 11, or the hook 51 may be provided on a detachable tire lug 52, as shown in Figure 12. The tire lug 52 being secured by a nut bolt structure 53 in the usual manner. In either event the hooks 51 are held at opposite sides of the wheel body in position to engage the eyes 50 when the chain is to be applied.

The loop flange 49 is provided at its outer end portion with a small eye 54 which is adapted for receiving therethrough an expanding locking device, such as shown in Figures 13, 14 and 15. This locking device comprises a shank 55 threaded at its inner end for adjustably receiving thereon a swivel ring 56, the ring serving as a connection between the adjacent end of a tread chain 38 and the rear end of the side chain 43. The shank 55 is suitably offset so as to register with the eye 54 and also for mounting on the inner side of the housing 28.

The outer end of the shank 55 is provided with a pair of outwardly beveled locking dogs 57 which are normally urged into outwardly sprung position, as shown in Figure 13, and which may be contracted as shown in Figure 14 for passage through the eye 54. The dogs 57 are provided with rearwardly facing shoulders 58 adapted to engage against the inner side of the eye 54 to hold the locking member from withdrawal and to thus hold the ends of the side chain 43 together.

As shown in Figures 5, 6, 7 and 10 particularly, the chain locking device is yieldingly held against the inner side of the holder 28 by means of a clip 59 which is secured to the lower end of the housing 28 in line with the adjacent locking device and the shank 55 of the device is seated in the clip 59 and may be withdrawn therefrom by pressure. The clip 59 is preferably recessed in the wall of the housing, and there, of course, is a clip 59 at each side of the housing, one for each of the locking devices for the side chains. The loop flange 49 which carries the eyes 50 and 54 is fitted into the upper end of the casing 28 after the chain has been deposited therein, and the lower or inner ends of the flanges 49 extend through the slots 40 and into the space within the carrier 28. The offset portion of the shank 55, shown in Figure 15, disposes the locking dogs 57 in outwardly offset position as applied to the side of the tire so that the dogs will register with the eyes 54 and by pressure of the hook 51 in engagement with the eye 50, forces the eye 54 over the adjacent dogs 57 to collapse them. The dogs expand at the rear side of the eye 54 and thus hold the side chain ends together.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. In a traction chain handling device, a segmental shaped casing having a cross sectional configuration corresponding to that of a tire tread and adapted to receive a traction chain therein with the cross chains nested together and with the side chains looped downwardly from between the cross chains, said holder having ledges and recesses in its opposite walls adapted to receive the ends of the cross chains and the loops of the side chains for holding the same releasably in stacked position, a pair of eyes carried upon the forward ends of the traction chain and extending inwardly from the opposite sides of the casing, spring operated locking devices carried upon the rear end of the chain for interlocking engagement with the forward end of the chain after the same has been applied to a tire, and releasable holding means for said locking device of the chain mounted upon the inner opposite sides of the casing at the rear end thereof for holding said locking devices yieldably in position to engage the forward end of the chain when completely applied to the tire and adapted to release said locking devices for movement out of the casing with the rear end portion of the traction chain.

2. In a traction chain device, a chain holder, a pair of eye members mounted on the forward end of the chain, means for withdrawing the chain from the holder and applying it to the tire of a vehicle, and a pair of locking devices mounted on the rear end of the chain and each comprising a pair of spring pressed locking dogs normally urged into diverging relation and adapted for insertion through said eye portion at the front end of the chain to interlock the ends of the chain at opposite sides of the tire.

3. A traction chain handling device comprising a segmental casing having a cross sectional configuration equal substantially to that of a tire tread and adapted to receive a traction chain therein with the cross chains nested together and the side chains looped downwardly from between the ends of the cross chains, a bracket rigidly mounted upon the axle housing of a vehicle, parallel arms pivoted between the bracket and the chain casing for holding the casing at all times in line with the vehicle wheel, means for normally holding the casing on said arms in raised position from the wheel, manual means for swinging the casing on the arms toward the wheel, and chain connecting means disposed between the wheel and the forward end of the chain for connecting the chain to the wheel when the casing is advanced toward the wheel.

LEVI A. CRABTREE.